(12) United States Patent
Tamitsuji (10) Patent No.: US 8,564,988 B2
(45) Date of Patent: Oct. 22, 2013

(54) DC-DC CONVERTER

(75) Inventor: Toshihiro Tamitsuji, Nagano (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 13/495,200

(22) Filed: Jun. 13, 2012

(65) Prior Publication Data

US 2013/0021825 A1    Jan. 24, 2013

(30) Foreign Application Priority Data

Jul. 22, 2011    (JP) ................................. 2011-160941

(51) Int. Cl.
  *H02M 3/06*    (2006.01)
  *G05F 1/46*    (2006.01)

(52) U.S. Cl.
  USPC ............................................. 363/62; 323/247

(58) Field of Classification Search
  USPC ......... 323/247, 259, 271, 282, 328, 344, 351; 363/62, 63
  See application file for complete search history.

(56) References Cited

U.S. PATENT DOCUMENTS

| | | | |
|---|---|---|---|
| 6,388,896 B1 * | 5/2002 | Cuk | 363/16 |
| 7,230,405 B2 * | 6/2007 | Jang et al. | 323/222 |
| 7,324,355 B2 | 1/2008 | Iwamoto et al. | |
| 8,134,351 B2 * | 3/2012 | Cuk | 323/271 |
| 2001/0011885 A1 * | 8/2001 | Nakagawa | 323/224 |
| 2005/0219872 A1 * | 10/2005 | Lys | 363/21.04 |
| 2007/0170897 A1 * | 7/2007 | Williams | 323/222 |
| 2013/0015836 A1 * | 1/2013 | Chang et al. | 323/351 |

FOREIGN PATENT DOCUMENTS

JP    2007-185072 A    7/2007

* cited by examiner

*Primary Examiner* — Adolf Berhane
(74) *Attorney, Agent, or Firm* — Carrier Blackman & Associates, P.C.; Joseph P. Carrier; William D. Blackman (57) ABSTRACT

A DC-DC converter, which is configured to step down a direct current voltage and then outputs to a load, the DC-DC converter comprising: a switching device that converts the direct current voltage into an alternating current voltage; a rectification unit that rectifies the alternating current voltage; an output capacitor that is connected in parallel with the load, and a smoothing inductor comprising a plurality of divided inductors connected in series, wherein at least one of the number of windings and the number of layers of respective windings of the divided inductors of the smoothing inductor is adjusted so that a sum total of inductances of the divided inductors become a desired inductance and so that a sum total of floating capacitances of the plurality of the divided inductors is smaller than a floating capacitance of single inductor having an equivalent inductance.

6 Claims, 6 Drawing Sheets

DC-DC CONVERTER

CROSS-REFERENCE TO RELATED APPLICATION

This application claims priority from Japanese Patent Application No. 2011-160941 filed on Jul. 22, 2012, the entire subject matter of which is incorporated herein by reference.

TECHNICAL FIELD

This disclosure relates to a DC-DC converter, and more particularly, to a step-down DC-DC converter using a switching device and an inductor.

BACKGROUND

In a step-down DC-DC converter using a switching device and an inductor, it is required to reduce a so-called switching loss.

Figure 4:
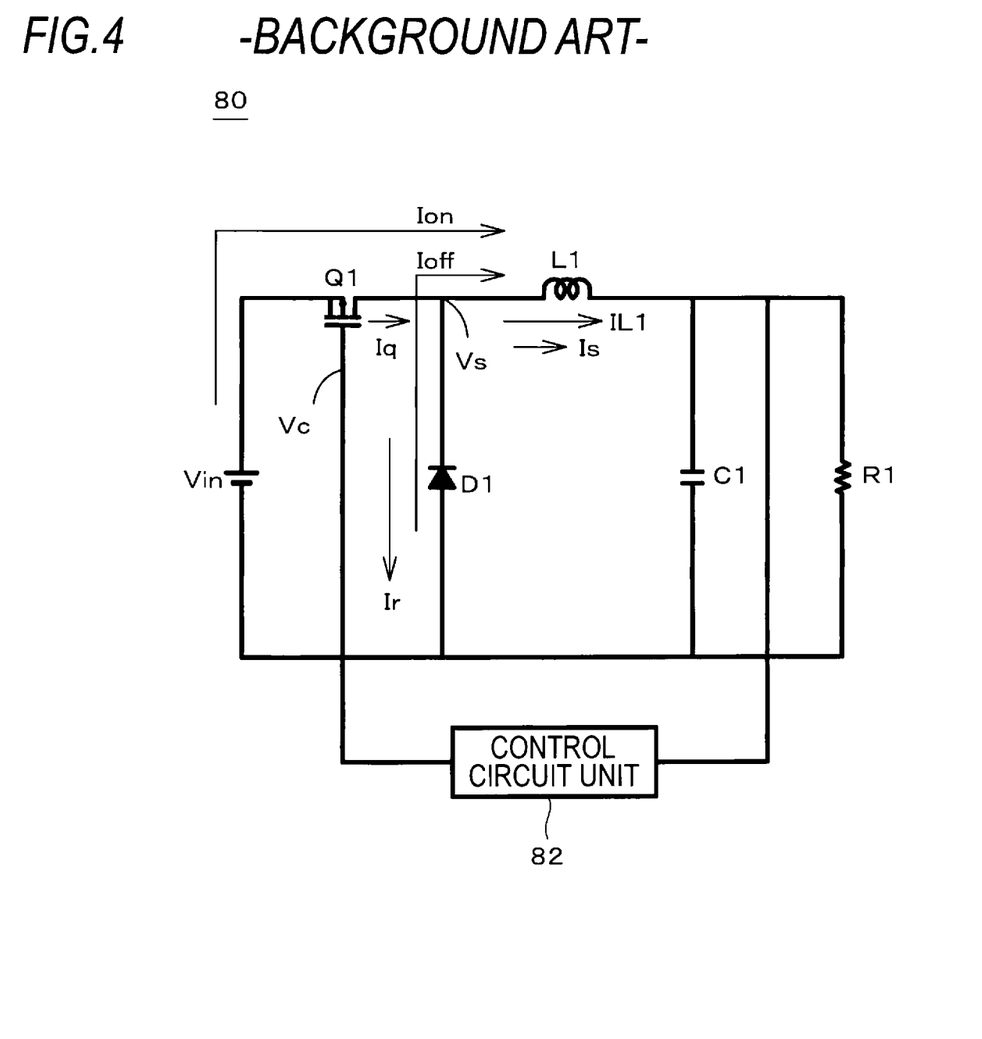
FIG. 4 illustrates a circuit configuration of a step-down DC-DC converter of the background art.

FIG. 4 illustrates a circuit configuration of a step-down DC-DC converter according to the background art.

As shown in FIG. 4, a DC-DC converter 80 of the background art has a switching device Q1, a smoothing inductor L1 and a rectifying diode D1. The DC-DC converter 80 steps down a direct current voltage that is supplied from a direct current power source Vin, and then outputs the same to a load R1. The switching device Q1 performs a switching operation in response to a signal (voltage Vc in FIG. 4) from a control circuit unit 82, thereby converting the direct current voltage into an alternating current voltage. The smoothing inductor L1 is provided for smoothing. The rectifying diode D1 rectifies alternating current power. An output capacitor C1 is connected in parallel with the load R1 and feeds power to the load R1.

In the DC-DC converter 80, when the switching device Q1 turns on, turn-on current Ion flows toward the smoothing inductor L1. When the switching device Q1 turns off, forward current (turn-off current) Ioff flows to the smoothing inductor L1 through the rectifying diode D1.

Here, when the switching device Q1 turns on, a reverse bias is applied to the rectifying diode D1 even though the current flowing in the rectifying diode D1 is cut off. During a reverse recovery time period, high recovery current Ir flows from a cathode of the rectifying diode D1 to an anode thereof. The recovery current Ir is superposed on the turn-on current Ion flowing in the switching device Q1. Thereby, the switching loss (turn-on loss) is caused.

JP-A-2007-185072 discloses a configuration of a DC-DC converter that reduces the recovery current Ir. In this DC-DC converter, a circuit, in which a secondary winding of an auxiliary transformer and a diode are connected in series, is connected to a direct current power supply, and a primary winding of the auxiliary transformer is connected to a switching device.

SUMMARY

However, the above DC-DC converter has another problem. That is, when the switching device Q1 turns on, surge current Is is generated.

Figure 5:
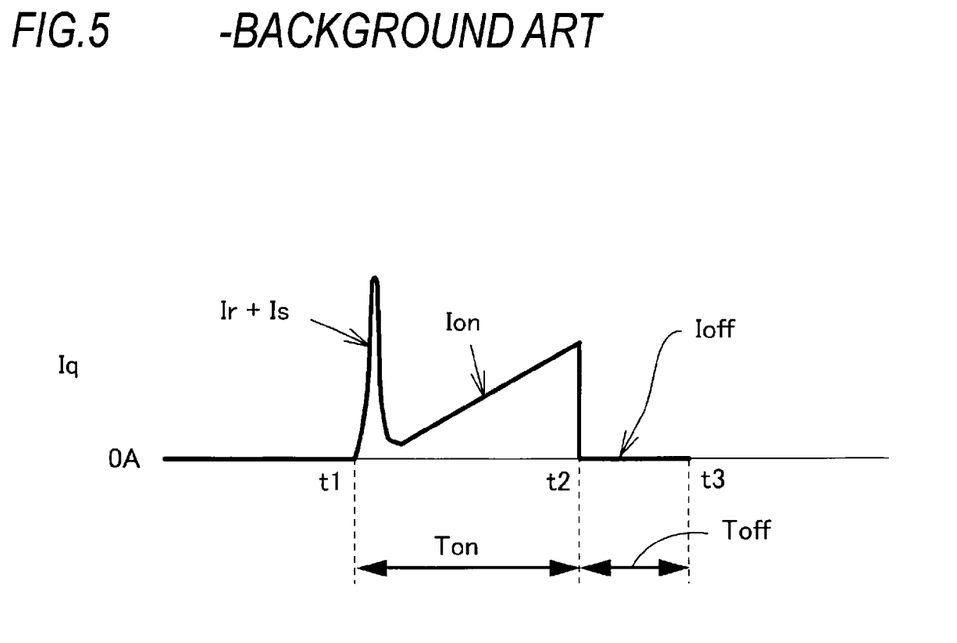
FIG. 5 schematically illustrates current waveforms of respective units of the DC-DC converter of the background art.

FIG. 5 schematically illustrates current waveforms of respective units of the DC-DC converter 80 of the background art.

In FIG. 5, the switching device Q1 turns on in a time period Ton from time t1 to time t2 and turns off in a time period Toff from time t2 to time t3.

When the switching device Q1 turns on, not only the recovery current Ir but also the surge current Is is superposed on the current Iq flowing in the switching device Q1. The surge current Is is generated depending on a floating capacitance occurring between the windings and between winding layers of the smoothing inductor L1 and becomes high current. As shown in FIG. 5, at time t1 at which the switching device Q1 turns on, the recovery current Ir and the surge current Is are superposed on the turn-on current Ion. Therefore, the current Iq flowing in the switching device Q1 becomes high peak current just after time t1.

Figure 6:
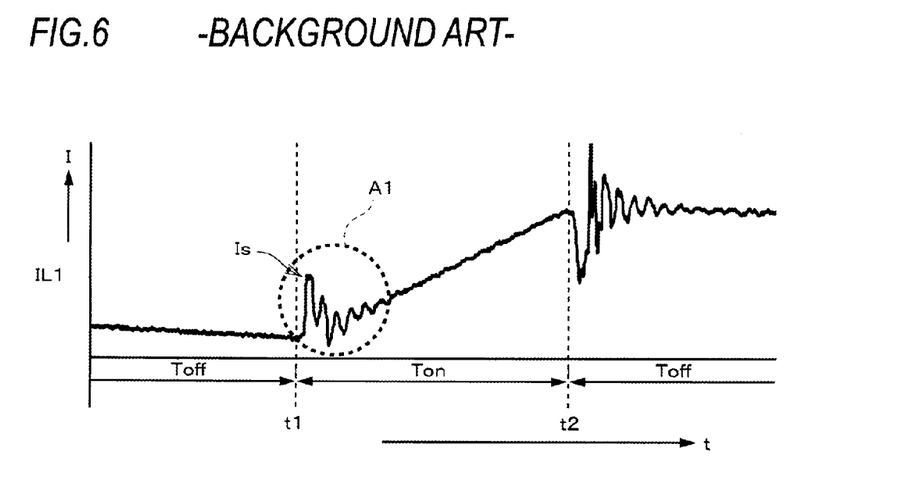
FIG. 6 is a graph illustrating a current waveform of charging current flowing in a smoothing inductor of the DC-DC converter of the background art.

FIG. 6 is a graph illustrating a current waveform of charging current IL1 flowing in the smoothing inductor L1 of the DC-DC converter 80 of the background art.

As shown in FIG. 6, when the switching device Q1 turns on at time t1, the surge current Is flows just after time t1, so that peak current is generated. Like this, the surge current Is flows, so that the switching loss is caused.

Also, as shown in a part surrounded by a broken line A1 of FIG. 6, after the surge current Is flows, the ringing of the charging current IL1 occurs for a while. Thereby, electromagnetic noises may be caused.

According to the technology disclosed in JP-A-2007-185072, the recovery current Ir is reduced. However, since the surge current Is as described above is not reduced, the switching loss due to the surge current Is is caused. In this configuration, particularly, in a configuration where the smoothing inductor L1 having relatively high inductance is required, the above problem becomes more prominent. That is, since the floating capacitance is increased in proportion to the inductance of the smoothing inductor L1, the switching loss is increased.

SUMMARY OF THE INVENTION

In view of the above, this disclosure provides at least a DC-DC converter capable of reducing a switching loss.

A DC-DC converter of one aspect of this disclosure is configured to step down a direct current voltage supplied from a direct current power supply and then outputs to a load, and the DC-DC converter comprises: a switching device that converts the direct current voltage into an alternating current voltage by a switching operation; a rectification unit that rectifies the alternating current voltage; an output capacitor that is connected in parallel with the load, and a smoothing inductor comprising a plurality of divided inductors connected in series, wherein at least one of the number of windings and the number of layers of respective windings of the plurality of the divided inductors of the smoothing inductor is adjusted so that a sum total of inductances of the plurality of the divided inductors become a desired inductance and so that a sum total of floating capacitances of the plurality of the divided inductors is smaller than a floating capacitance of a single inductor having an equivalent inductance.

In the above described DC-DC converter, each of the divided inductors may have direct current superposition characteristics so that it is not saturated by maximum current flowing at the time of operation.

In the above described DC-DC converter, the switching device and the rectification unit may be connected in series between positive and negative electrodes of the direct current power supply, and the smoothing inductor may be connected between a connection point of the switching device and the rectification unit and a connection point of the output capacitor and the load.

In the above described DC-DC converter, the switching device and the rectification unit may be connected in series between a positive electrode of the direct current power supply and a connection point of the output capacitor and the load, and wherein the smoothing inductor may be connected between a connection point of the switching device and the rectification unit and a negative electrode of the direct current power supply.

In the above described DC-DC converter, the smoothing inductor may have two divided inductors that have substantially equivalent inductances to each other and are connected in series.

According to this disclosure, the smoothing inductor is configured by the plurality of divided inductors so that it has a floating capacitance smaller than that of one inductor having an equivalent inductance. Therefore, it is possible to provide a DC-DC converter capable of reducing a switching loss.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, DC-DC converters according to illustrative embodiments of this disclosure will be described.

First Illustrative Embodiment

Figure 1:
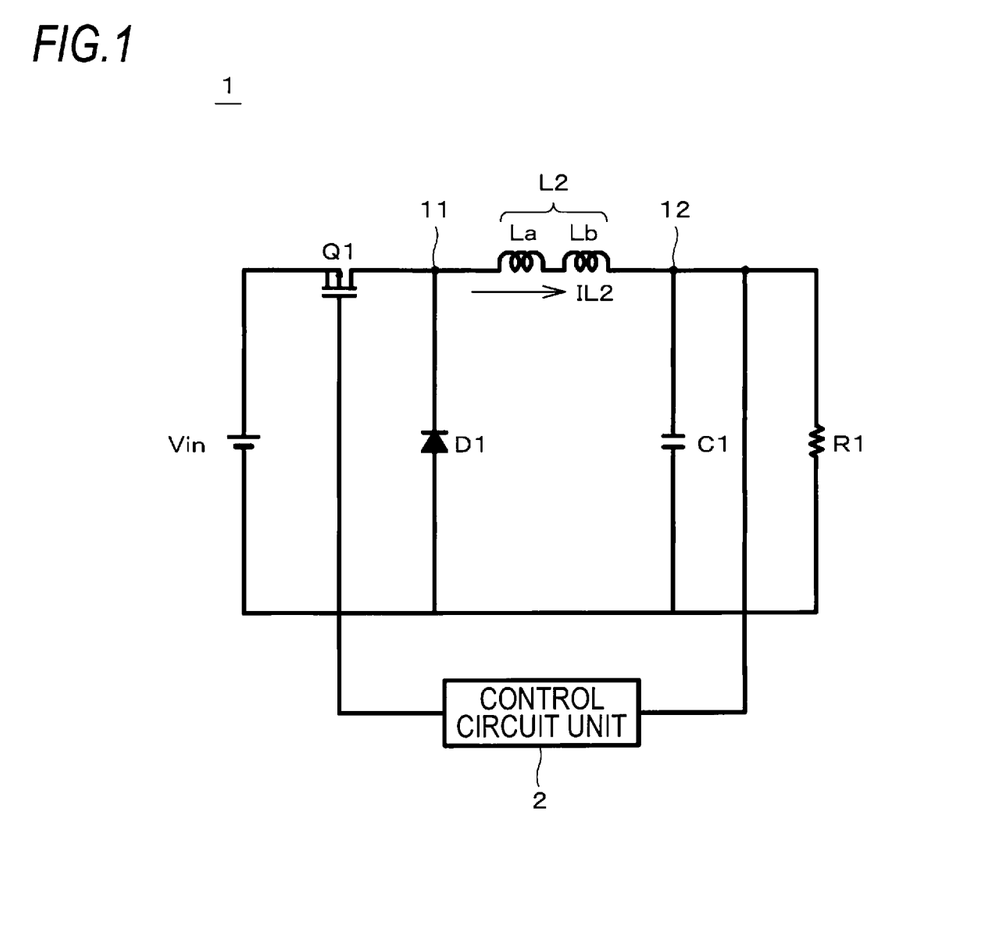
FIG. 1 illustrates a circuit configuration of a DC-DC converter according to a first illustrative embodiment of this disclosure.

FIG. 1 illustrates a circuit configuration of a DC-DC converter 1 according to a first illustrative embodiment of this disclosure.

As shown in FIG. 1, the DC-DC converter 1 has a switching device Q1, a rectifying diode (which is an example of the rectification unit) D1, an output capacitor C1, a smoothing inductor or inductor unit L2 and a control circuit unit 2 that controls an operation of the switching device Q1. The DC-DC converter 1 steps down a direct current voltage that is supplied from a direct current power supply Vin and then outputs the same to a load R1.

The switching device Q1 and the rectifying diode D1 are connected in series between positive and negative electrodes of the direct source power supply Vin. A cathode of the rectifying diode D1 is connected to the switching device Q1 and an anode of the rectifying diode D1 is connected to the negative electrode of the direct current power supply Vin. The output capacitor C1 is connected in parallel with the load R1. The smoothing inductor L2 is connected between a connection point 11 of the switching device Q1 and the rectifying diode D1 and a connection point 12 of the output capacitor C1 and the load R1. In other words, the one ends of the respective ends of the output capacitor C1 and the load R1 are connected to the positive electrode of the direct current power supply Vin via the switching device Q1 and the smoothing inductor L2. The other ends of the respective ends of the output capacitor C1 and the load R1 are connected to the negative electrode of the direct current power supply Vin.

The switching device Q1 is an FET (Field Effect Transistor), for example. A gate terminal of the switching device Q1 is connected with the control circuit unit 2.

The switching device Q1 converts a direct current voltage that is supplied from the direct current power supply Vin into an alternating current voltage by a switching operation. The alternating current voltage is rectified, smoothed and then output to the load R1 by a rectification smoothing circuit having the rectifying diode D1, the smoothing inductor L2 and the output capacitor C1. Thereby, the DC-DC converter 1 converts the direct current voltage that is supplied from the direct current power supply Vin into a direct current voltage lower than the supplied direct current voltage and then outputs the same to the load R1.

The control circuit unit 2 sends a signal to the gate terminal of the switching device Q1 and thus turns on and off the switching device Q1. The control circuit unit 2 can control the switching device Q1 by a PWM signal, for example, thereby changing the voltage that is output to the load R1. The control circuit unit 2 is also connected to the connection point 12 of the output capacitor C1 and the load R1 and detects the voltage that is output to the load R1. The control circuit unit 2 changes the signal to be sent to the switching device Q1 in response to the detected voltage, and feedback-control of the voltage output to the load R1 is performed.

Here, in this illustrative embodiment, the smoothing inductor L2 has two divided or separated inductors (first divided inductor La and second divided inductor Lb). The smoothing inductor L2 is configured so that the first divided inductor La and the second divided inductor Lb are connected in series.

Figure 7:
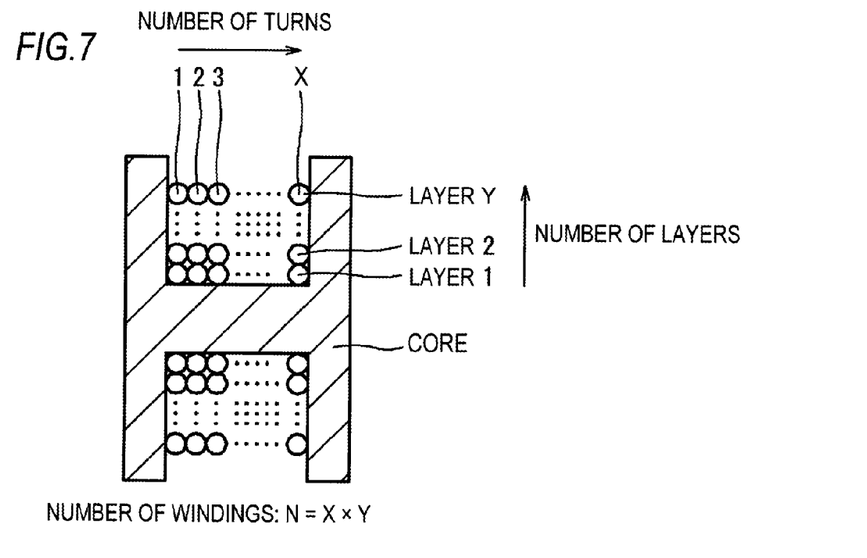
FIG. 7 illustrates windings of an inductor.

The divided inductors La, Lb are configured so that a sum total of respective inductances becomes a desired inductance. That is, the inductance of the smoothing inductor L2 becomes a desired inductance. Also, the divided inductors are configured so that a sum total of floating capacitances of the divided inductors La, Lb is smaller than a floating capacitance of one inductor having an equivalent inductance. At least one of the number of windings and the number of layers of the respective windings of the divided inductors La, Lb is adjusted so that the divided inductors La, Lb are configured as described above. FIG. 7 illustrates the windings of an inductor and also illustrates a relation among the number of layers, the number of windings, the number of turns, and the number of windings.

Also, in this illustrative embodiment, the respective inductances of the divided inductors La, Lb are substantially equivalent to each other. Each of the divided inductors La, Lb has direct current superposition characteristics so that it is not saturated by maximum current flowing at the time of operation.

Briefly describing, an inductance L of an inductor and a floating capacitance Cs thereof are calculated as follows.

The inductance L of one inductor is calculated by a following equation.

$$L(H) = k \times \mu e \times N2$$

Here, k is constant determined depending on shape and the like; μe is effective magnetic permeability; and N is the number of windings Here, it is assumed that the smoothing inductor having the inductance L is configured by connecting m-divided inductors, which is divided by m, having the same number of windings in series. At this time, the number of windings of each of the m-divided inductors is N2. Comparing the smoothing inductor with one smoothing inductor having an inductance L having the number of windings N1, a following relation equation is obtained.

$$k \times \mu e \times (N1)^2 = m \times k \times \mu e \times (N2)^2, \text{ and thus } N2 = N1/m^{(1/2)}$$

From the above equation, it can be said that the number of windings of each divided inductor is preferably made to be $1/m^{(1/2)}$ (a reciprocal number of the square root of m) times of the number of windings of the smoothing inductor that is configured by one inductor. That is, the number of windings of each divided inductor can be made to be smaller than that of the smoothing inductor that is configured by one inductor. Accordingly, in case that the smoothing inductor L2 is configured by two divided inductor La, Lb, like this illustrative embodiment, for example, the number of windings of respective the divided inductors La, Lb can be made to be the number of windings that is obtained by dividing the number of windings of the smoothing inductor configured by one inductor, by the square root of 2.

Then, the floating capacitance Cs of one inductor is calculated as follows.

$$Cs(pF) = \alpha \times (S/d) \times Lm$$

Here, α is constant determined by specific permittivity and the like; S is an area (mm2) on which the winding abuts; d is distance between the windings; and Lm is the number of layers.

From the above equation, it can be seen that the larger the number of the layers Lm of the windings and the larger the area S on which the winding abuts between the layers, the larger the floating capacitance Cs. If the ranges of the turns of the windings are the same, as the number of windings is increased, the number of layers Lm is also increased. Thus, the floating capacitance Cs is increased as much.

Also, when the smoothing inductor L2 is configured by connecting the two divided inductors La, Lb in series, for example, a sum total Cst of the floating capacitances is expressed by a following equation (Cs1, Cs2: floating capacitances of the two divided inductors La, Lb).

$$1/Cst = 1/Cs1 + 1/Cs2$$

Since the smoothing inductor L2 is configured by the two divided inductors La, Lb, it is possible to reduce at least one of the number of windings and the number of layers, thereby reducing the floating capacitance Cs. Also, it is possible to make the sum total Cst of the floating capacitances of the smoothing inductor L2 smaller than the total sum of the respective floating capacitances C1, C2 of the divided inductors La, Lb.

In this illustrative embodiment, since the inductance of the first divided inductor La and the inductance of the second divided inductor Lb are substantially equivalent, it is possible to use the inductors having the same specification as the divided inductors La, Lb. Therefore, the inductors configured to have the direct current superposition characteristics so that they are not saturated with the maximum current and to have the floating capacitance as small as possible by adjusting the number of windings or layers of the windings can be used as the divided inductors La, Lb, so that it is possible to easily design the specification of the inductors. In addition to this, it is possible to improve the productivity and to reduce the managing cost without increasing the types of the parts at the time of producing the product.

Effects of Illustrative Embodiment

In this illustrative embodiment, the smoothing inductor L2 is configured by the plurality of divided inductors La, Lb, so that the overall floating capacitance of the smoothing inductor L2 is reduced. Therefore, the surge current, which flows to the smoothing current L2 and is superposed on the charging current when the switching device Q1 turns on, is suppressed.

That is, as described above, the larger the floating capacitance of the smoothing inductor when the switching device Q1 turns on, the more the surge current flows which is superposed on the charging current of the smoothing inductor. When the inductance of the smoothing inductor is reduced, the floating capacitance is reduced. However, as the inductance is small, the charging current that can be accumulated is reduced as much, and thus the saturation is easily made even when the small current flows. Therefore, there is a limit on reduction of the inductance of the smoothing inductor. Also, when it is intended to obtain the desired inductance with one smoothing inductor, the number of windings or layers of the windings of the smoothing inductor is increased. As the number of windings or layers is increased, the floating capacitance between the windings or winding layers is increased, so that the surge current is increased.

Compared to this, according to this illustrative embodiment, the smoothing inductor L2 is configured by the two divided inductors La, Lb so that the sum total of the inductances of the divided inductors La, Lb becomes the desired inductance. By using the two divided inductors La, Lb, it is possible to reduce at least one of the number of windings and the number of layers of the windings of the respective divided inductors La, Lb. Thereby, it is possible to remarkably reduce the sum total of the floating capacitances of the respective divided inductors La, Lb, compared to that of the one inductor having the equivalent inductance. Accordingly, it is possible to reduce the switching loss of the DC-DC converter 1 and to realize the high efficiency.

Figure 2:
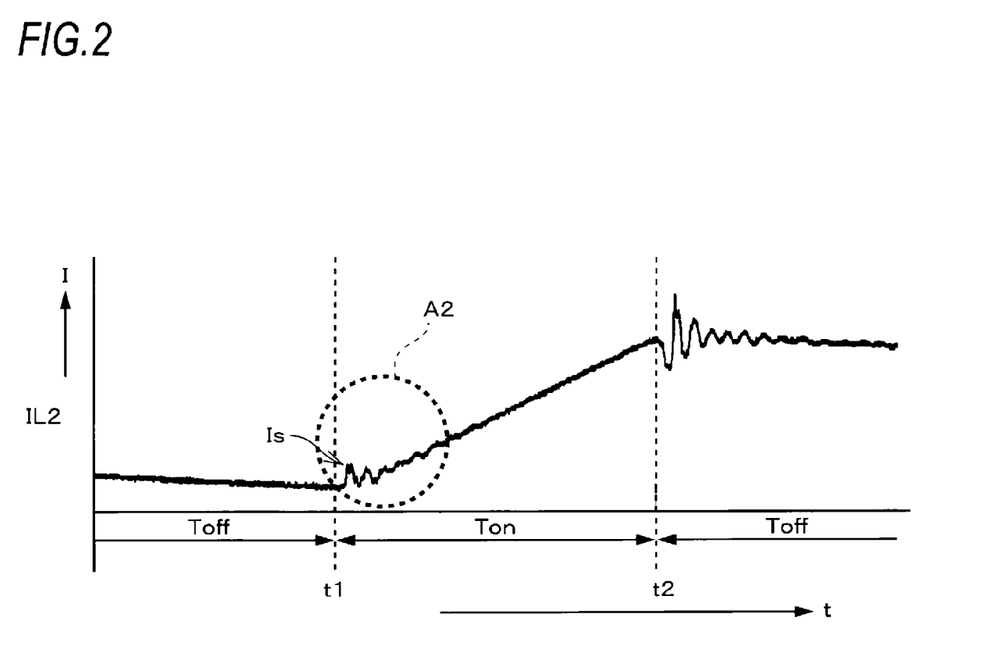
FIG. 2 is a graph illustrating a current waveform of charging current flowing in a smoothing inductor of the DC-DC converter of this illustrative embodiment.

FIG. 2 is a graph illustrating a current waveform of charging current IL2 flowing in the smoothing inductor L2 of the DC-DC converter 1 of this illustrative embodiment.

In FIG. 2, an example of actually measured data of the waveform of the charging current IL2 flowing in the smoothing inductor L2 is shown. In FIG. 2, the switching device Q1 turns on in a time period Ton from time t1 to time t2 and turns off up to time t1 and after time t2.

As shown in FIG. 2, in this illustrative embodiment, even when the switching device Q1 turns on at time t1, only the minor surge current Is is superposed on the charging current IL2 of the smoothing inductor L2. Like this, in the DC-DC converter 1, the surge current Is is considerably suppressed, compared to the DC-DC converter as shown in FIG. 6. As a result, it is possible to reduce the switching loss. Also, as shown with a broken line A2 in FIG. 2, the ringing in the background art just after the surge current Is flows does not occur. Thus, it is also possible to reduce the electromagnetic noises.

Second Illustrative Embodiment

Figure 3:
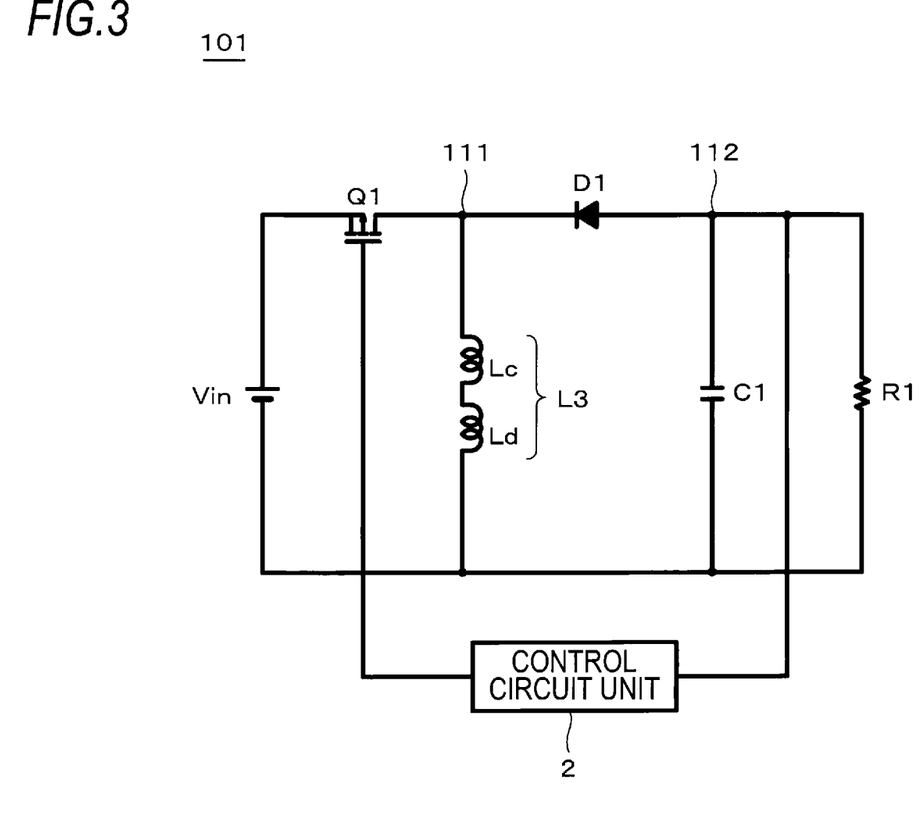
FIG. 3 illustrates a circuit configuration of a DC-DC converter according to a second illustrative embodiment of this disclosure.

Since the basic configuration of the DC-DC converter according to a second illustrative embodiment is the same as that of the first illustrative embodiment, the detailed description will omitted. In the second illustrative embodiment, the positions of the smoothing inductor and the rectifying diode are different from those of the first illustrative embodiment.

FIG. 3 illustrates a circuit configuration of a DC-DC converter 101 according to the second illustrative embodiment.

In the second illustrative embodiment, the DC-DC converter 101 is a step-down inverting type in which an output is a negative voltage. As shown in FIG. 3, in the DC-DC converter 101, the switching device Q1 and the rectifying diode D1 are connected in series between the positive electrode of the direct current power supply Vin and a connection point 112 of the output capacitor C1 and the load R1. The cathode of the rectifying diode D1 is connected to the switching device Q1, and the anode of the rectifying diode D1 is connected to the connection point 112. The smoothing inductor L3 is connected between a connection point 111 of the switching device Q1 and the rectifying diode D1 and the negative electrode of the direct current power supply Vin.

The smoothing inductor L3 has two divided inductors (first inductor Lc and second inductor Ld) that are connected in series. Like the divided inductors La, Lb of the first illustrative embodiment, the two divided inductors Lc, Ld are configured so that the sum total of the respective inductances, i.e., the inductance of the smoothing inductor L3 becomes a desired inductance. The respective inductances of the divided inductors Lc, Ld are substantially equivalent. Also, at least one of the number of windings and the number of layers of the windings of the divided inductors La, Lb is adjusted so that the divided inductors La, Lb have the direct current superposition characteristics in which they are not saturated by the maximum current flowing at the time of operation and so that configured to have the floating capacitances as small as possible.

Like this, also in the second illustrative embodiment, the smoothing inductor L3 is configured by the two divided inductors Lc, Ld, so that it is possible to realize the same effects as those of the first illustrative embodiment.

[Others]

In the above illustrative embodiments, the inductances of the two divided inductors (first and second inductors) are substantially equivalent. However, the inductances of the two divided inductors may not be substantially equivalent. That is, the divided inductors having different inductances may be used as long as the sum total of the inductances is the desired inductance and the sum total of the floating inductances is designed to be as small as possible. The respective divided inductors may have the direct current superposition characteristics so that they are not saturated with respect to the maximum current flowing in the respective inductors.

The divided inductors configuring the smoothing inductor are not limited to two and it may be configured by three or more. In this case, the plurality of divided inductors is configured so that the sum total of the respective inductances becomes the desired inductance and so that the sum total of the floating capacitances of the divided inductors is smaller than the floating capacitance of the one inductor having the equivalent inductance by adjusting at least one of the number of windings and the number of layers of the respective windings.

The switching device is not limited to the FET and may be a bipolar type transistor, for example. Also, instead of the rectifying diode, another switching device (FET and the like) may be provided, and the control circuit unit may synchronously operate the two switching devices at predetermined timing. Also in this case, since it is possible to reduce the floating capacitance of the smoothing inductor, it is possible to reduce the switching loss.

The illustrative embodiments are exemplary, and this disclosure is not limited thereto. The scope of this disclosure is defined by not the above descriptions and includes the meanings equivalent and all changes of the above.

What is claimed is:

1. A DC-DC converter, which is configured to step down a direct current voltage supplied from a direct current power supply and then output to a load, the DC-DC converter comprising:
    a switching device that converts the direct current voltage into an alternating current voltage by a switching operation;
    a rectification unit that rectifies the alternating current voltage;
    an output capacitor that is connected in parallel with the load, and
    a smoothing inductor unit comprising a plurality of divided inductors connected in series,
    wherein at least one of a number of windings and a number of layers of respective windings of the plurality of the divided inductors of the smoothing inductor unit is adjusted so that a sum total of inductances of the plurality of the divided inductors becomes a desired inductance and so that a sum total of floating capacitances of the plurality of the divided inductors is smaller than a floating capacitance of a single inductor having an equivalent inductance.

2. The DC-DC converter according to claim 1,
    wherein each of the divided inductors has direct current superposition characteristics so that it is not saturated by maximum current flowing at the time of operation.

3. The DC-DC converter according to claim 1,
    wherein the switching device and the rectification unit are connected in series between positive and negative electrodes of the direct current power supply, and
    wherein the smoothing inductor unit is connected between a connection point of the switching device and the rectification unit and a connection point of the output capacitor and the load.

4. The DC-DC converter according to claim 1,
    wherein the switching device and the rectification unit are connected in series between a positive electrode of the direct current power supply and a connection point of the output capacitor and the load, and
    wherein the smoothing inductor unit is connected between a connection point of the switching device and the rectification unit and a negative electrode of the direct current power supply.

5. The DC-DC converter according to claim 1,
    wherein the smoothing inductor unit has two divided inductors that have substantially equivalent inductances to each other and are connected in series.

6. The DC-DC converter according to claim 1,
    wherein each of the divided inductors has a smaller number of windings than that of the single inductor having an equivalent inductance.

* * * * *